United States Patent [19]
Lisbin et al.

[11] 3,861,563
[45] Jan. 21, 1975

[54] SELF-LEVELING DISPENSER WITH ARTICLE SEPARATOR

[75] Inventors: Arthur Lisbin, Upper Saddle River; George Tanney, Wayne Township, Passaic County, both of N.J.; James Albanese, Forest Hills, N.Y.

[73] Assignee: Levelator Corporation, Paterson, N.J.

[22] Filed: Apr. 12, 1973

[21] Appl. No.: 350,501

[52] U.S. Cl. ................................. 221/279, 220/29
[51] Int. Cl. ............................................. A47f 1/06
[58] Field of Search ...... 221/279, 280, 311; 312/71; 211/49 D; 220/93, 33, 29

[56] References Cited
UNITED STATES PATENTS

| 1,179,505 | 4/1916 | Coburn et al. | 220/33 UX |
| 1,788,348 | 1/1931 | Lemme | 221/279 X |
| 1,844,285 | 2/1932 | Johnson | 221/279 X |
| 2,226,626 | 12/1940 | Mann | 221/280 X |
| 3,184,104 | 5/1965 | DeDomenico et al. | 221/311 X |
| 3,332,210 | 7/1967 | Tordi | 221/279 X |
| 3,565,500 | 2/1971 | Shelley | 312/71 |
| 3,664,546 | 5/1972 | Shelley | 221/279 |

Primary Examiner—Robert B. Reeves
Assistant Examiner—Francis J. Bartuska
Attorney, Agent, or Firm—Frank J. Jordan

[57] ABSTRACT

A dispensing device for dispensing articles includes a container in which a column of the articles are arranged in column form. The container has an opening through which the articles are dispensed and biasing means urge the column of articles in one longitudinal direction toward the opening. Stop means are mounted in a fixed position relative to the opening in order to engage one longitudinal end of the column of articles. The biasing means urges the column in one longitudinal direction so that the end article engages the stop means, whereby when the end article is withdrawn upon being dispensed, the biasing means moves the column in the aforementioned one longitudinal direction to cause the next succeeding article in the stacked column to engage the stop means and to tilt at an acute angle relative to the longitudinal axis of the column to thereby facilitate dispensing.

3 Claims, 20 Drawing Figures

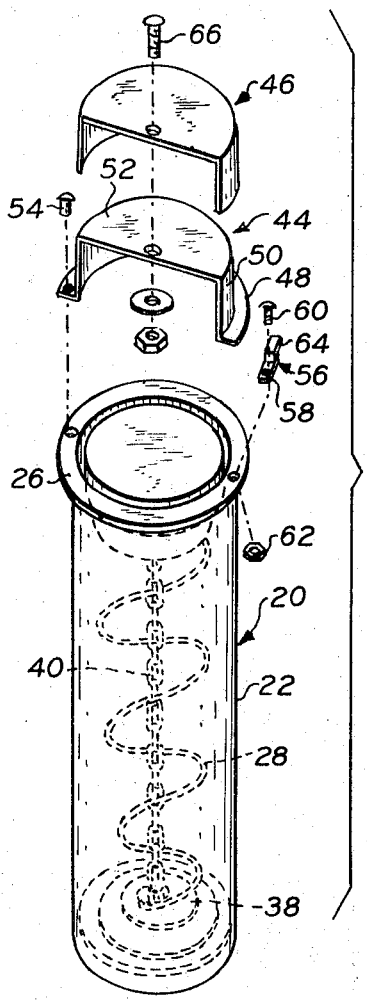
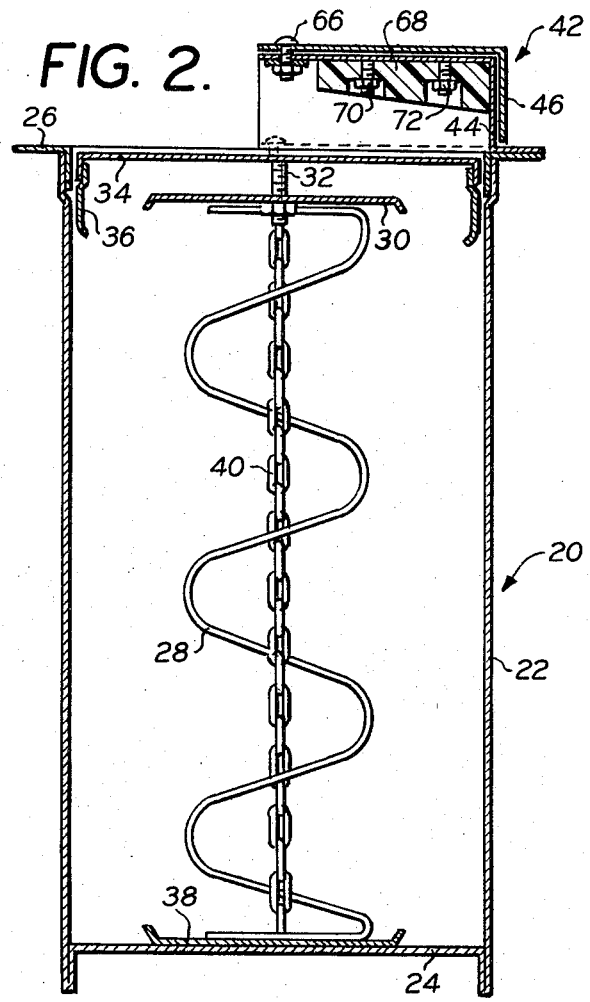
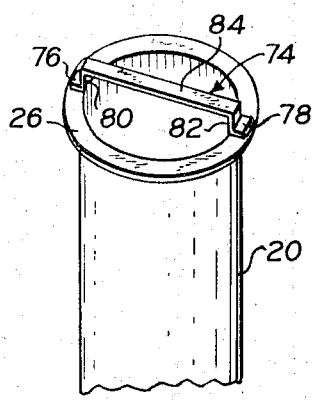
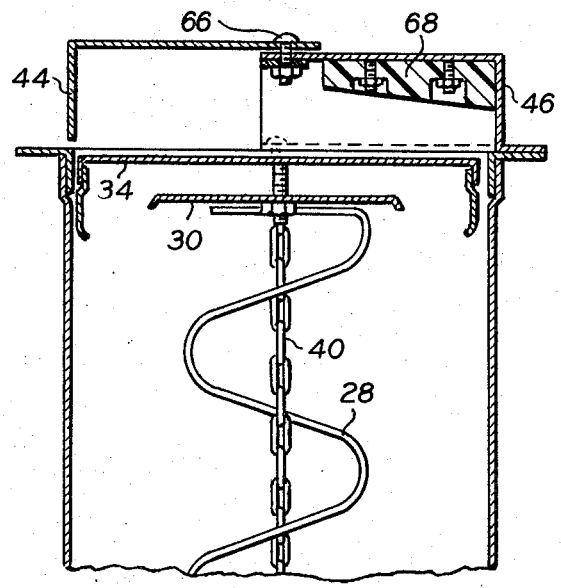
FIG. 1.
FIG. 2.
FIG. 4.
FIG. 3.

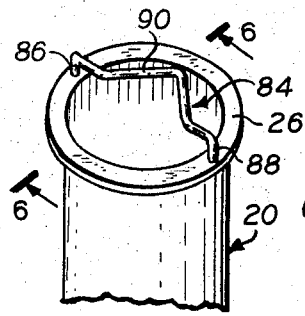
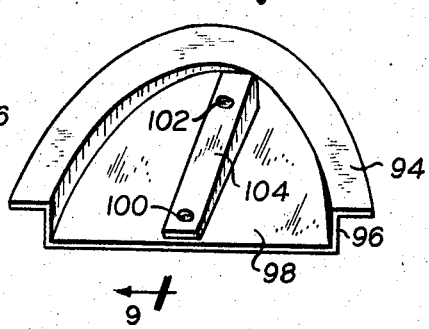
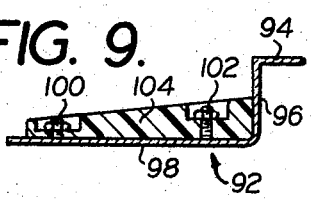
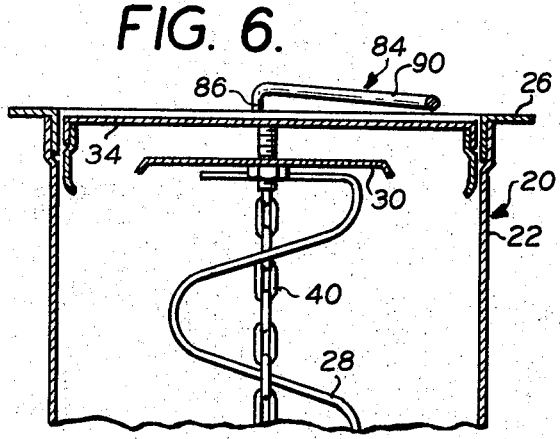
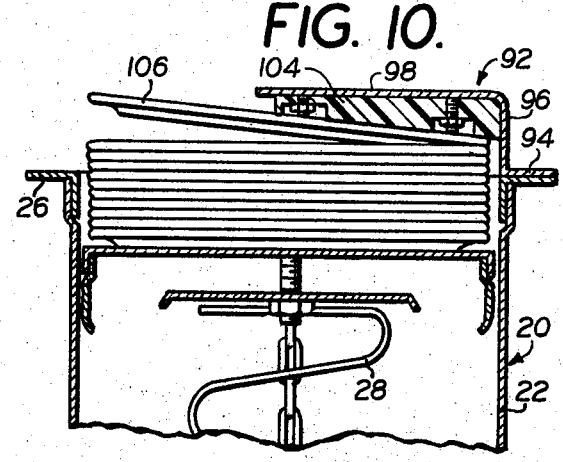
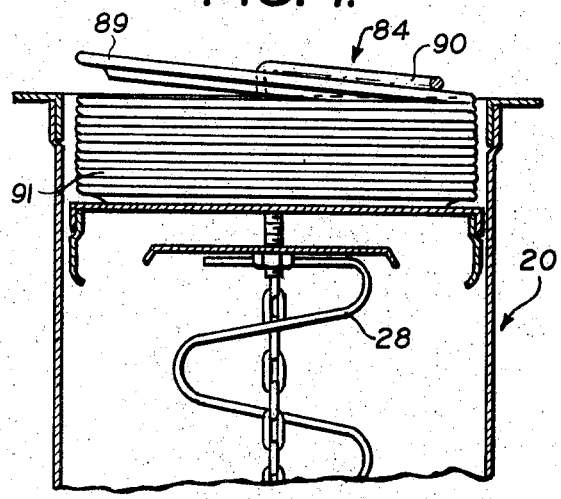
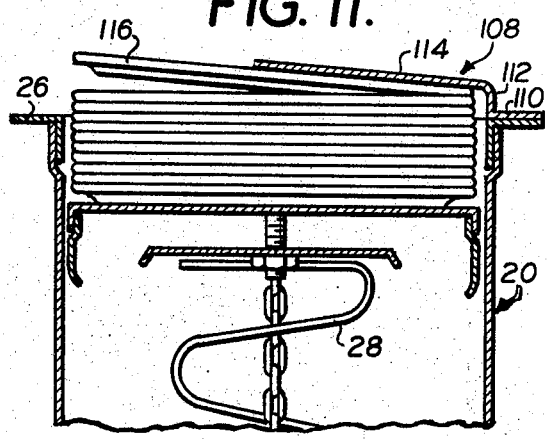
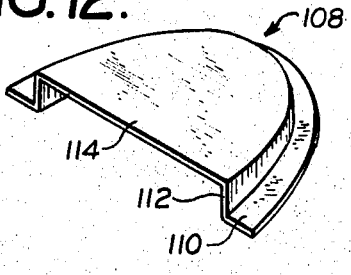

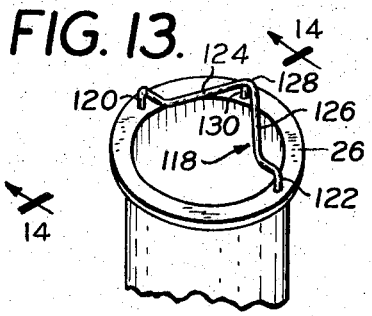
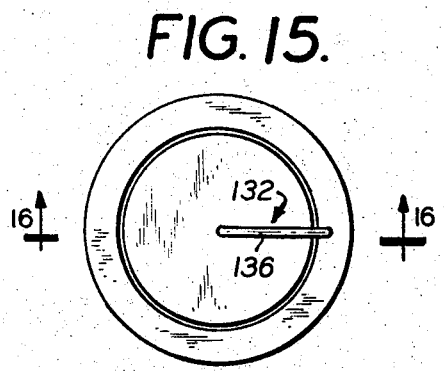
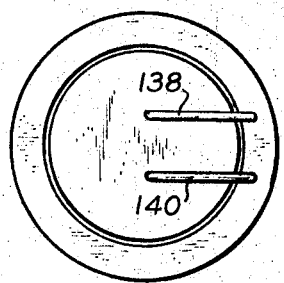
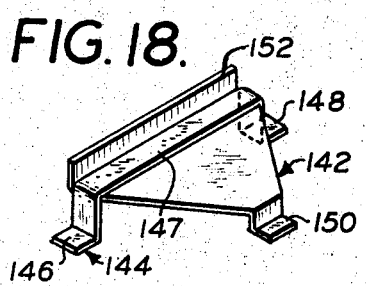
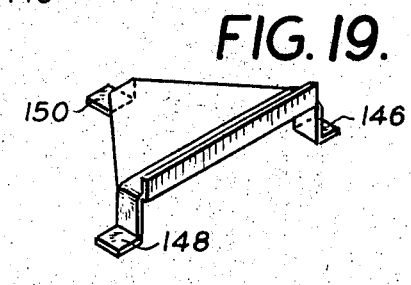
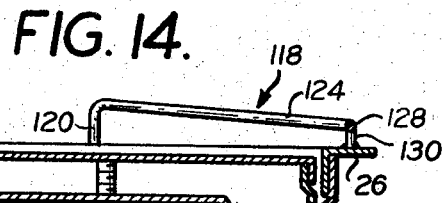
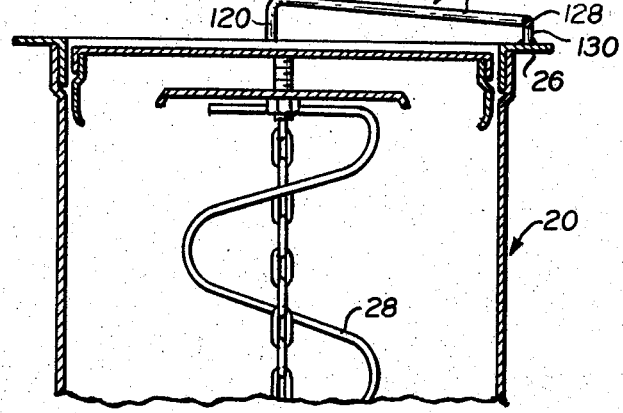
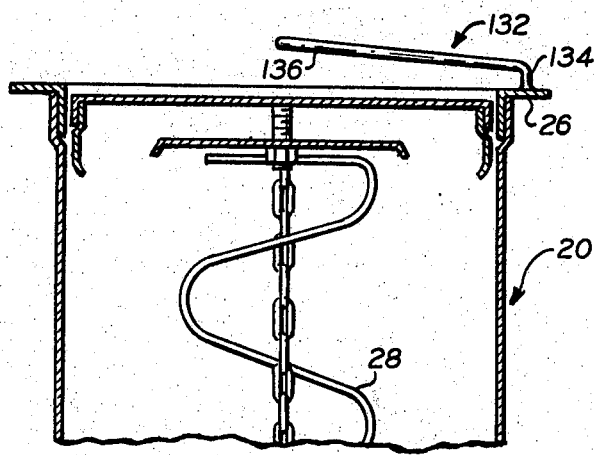
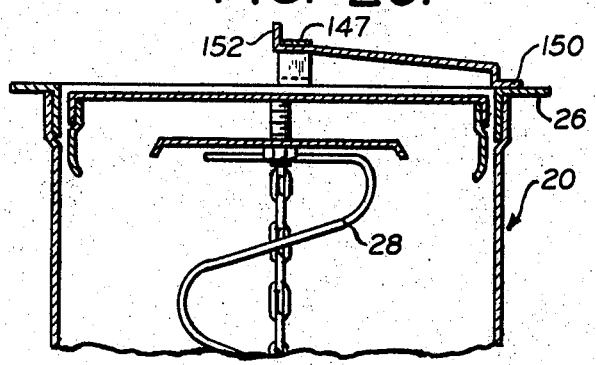

SELF-LEVELING DISPENSER WITH ARTICLE SEPARATOR

BACKGROUND OF THE INVENTION

This invention relates to a dispenser and more particularly to a dispenser of the type in which the articles to be dispensed are biased so as to place the top article in a position where it may be easily reached.

Dispensers are frequently used in restaurants, service counters, serving stations and other locations for dispensing various types of articles, wares and the like such as dishes, platters, saucers, bowls, cups, glasses and the like. Dispensers are also used for dispensing other articles including food, for example bread and other items.

It is desirable that such dispensers be arranged so that the article to be dispensed may be easily and readily reached by the user. Heretofore, dispensers have been known in which the articles are stacked, one upon the other, in column form and whereby the stacked column is disposed within an elongated tube. A spring is disposed at the bottom of the tube and biases the articles in an upward direction. The arrangement is such that the articles at the top of the stacked column are maintained generally at a fixed position or fixed elevation in which the top article is readily accessible to the user. As the user removes the top article, the weight of the stacked column is reduced, and accordingly, the spring, which is now lifting a smaller weight, expands a little bit more and raises the stacked column. Accordingly, as each top article is removed the stacked column continues to rise to maintain the upper article in a generally fixed position or level elevation where it is readily accessible to the user.

In order to provide suitable design for this type of dispenser, the spring at the bottom of the dispenser is selected so that it maintains the stack at the desired elevation taking into consideration the weight of the articles to be dispensed. Accordingly, in selecting a dispenser for a particular application, the weight of the articles to be dispensed is a factor which must be considered because for heavier articles, a heavier spring would, of course, be required.

Once the dispenser is installed, should it become desirable to dispense different articles or articles of different weights, a problem might arise inasmuch as the spring in the dispenser may not be appropriate for the different articles to be used. For example, if heavier articles are to be used, the spring may not be strong enough to raise the column to the appropriate and desired elevation.

Accordingly, an object of the present invention is to overcome the above mentioned disadvantages of prior art devices and provide a dispenser which is able to maintain the top article at a constant level, independently of the weight of the article to be dispensed.

Another object of the present invention is to provide a dispenser which is operable to efficiently dispense articles of different weights.

A further object of the present invention is to provide a dispenser which is relatively inexpenseive to manufacture, which operates reliably with different articles, and which is flexible in operation to handle articles of different weights and design.

Other features which are considered charateristic of the invention are set forth in the appended claims.

Although the invention is illustrated and described in relationship to specific embodiments, it is nevertheless not intended to be limited to the details shown, since various modifications and structural changes may be made therein without department from the spirit of the invention and within the scope and range of equivalents of the claims.

The construction and operation of the invention, however, together with additional objects and advantages thereof will be best understood from the following description of specific embodiments when read in connection with the accompanying drawings.

BRIEF DESCRIPTION OF THE DRAWINGS

FIG. 1 is an exploded view of a dispenser according to one embodiment of the present invention.

FIG. 2 is a sectional view, on a larger scale, of the dispenser shown in FIG. 1 with the cover shown in an open position.

FIG. 3 is a partial sectional view, similar to FIG. 2, but showing the cover in a closed position.

FIG. 4 is a perspective view of an alternate embodiment wherein a strap element is disposed over the open end of the dispenser.

FIG. 5 is a perspective view of another alternate embodiment in which a wire element is disposed over the open end of the dispenser.

FIG. 6 is a partial, sectional view, on a larger scale, taken along with line 6—6 in FIG. 5.

FIG. 7 is a partial, sectional view, similar to FIG. 6, but showing the plates in dispensing position.

FIG. 8 is a perspective of a cover for a dispensing unit in accordance with a further alternate embodiment of the invention.

FIG. 9 is a sectional view taken along with line 9—9 in FIG. 8.

FIG. 10 is a partial sectional view of a dispensing unit on which the cover shown in FIGS. 8 and 9 is used.

FIG. 11 is a partial sectional view of a further alternate embodiment in which the cover has an inclined upper wall.

FIG. 12 is a perspective view of the cover shown in FIG. 11.

FIG. 13 is a perspective view of a further alternate embodiment in which a wire element is disposed over the open end of the dispenser.

FIG. 14 is a partial, sectional view, on a larger scale, taken along with line 14—14 in FIG. 13.

FIG. 15 is a plan view of another alternate embodiment of a dispensing unit.

FIG. 16 is a partial, sectional view, on a larger scale, taken along with the line 16—16 in FIG. 15.

FIG. 17 is a plan view of a further alternate embodiment in whcih two extending arm elements are employed.

FIG. 18 is a perspective view of yet a further alternative embodiment of a dispenser.

FIG. 19 is a perspective view of the embodiment shown in FIG. 18 but viewed from a different direction.

FIG. 20 is a partial sectional view of the embodiment shown in FIGS. 18 and 19.

DETAILED DESCRIPTION OF THE DISCLOSURE

Referring to the drawings, and specifically to the embodiment in FIGS. 1-3, there is shown a dispensing tube 20 having cylindrical side walls 22 joined to a bottom 24 and having a flange 26 about the periphery of the opened end of the tube. The dispensing tube 20 may be mounted within an opening of a counter top or within an opening in a portable dispensing unit or similar location. The dispensing tube 20 may be constructed of sheet metal such as stainless steel or other materials such as plastic or the like.

Disposed within the tube 20 is a biasing means in the form of a coil spring 28. The spring 28 is located in the tube 20 with the longitudinal axis of the spring 28 generally aligned with the longitudinal axis of the tube 20. A disk element 30 is suitably secured to the upper longitudinal end of the spring 28. The disk element 30 has secured thereto by a threaded member 32, a plate 34 having a skirt 36. The plate 34 is adapted to receive the bottom article of a stacked column of articles to be dispensed. The lower, longitudinal end of the spring 28 bears against a disk element 38 disposed at the bottom of the dispensing tube 20.

A flexible means in the form of a chain 40 is secured to the longitudinal ends of the spring 28 or to the disks 30, 38, thereby limiting the longitudinal, maximum extension of the spring. Thus, in FIG. 2, the spring 28 is shown in its maximum extended position as indicated by the fact that the chain is pulled taut. Because the chain 40 is flexible the latter will not prevent the plate 34 from being displaced downwardly against the bias of the spring 40.

Suitably mounted on the flange 22 of the tube 20 is a cover and stop means indicated generally at 42 in FIG. 2. The cover is made in two sections 44 and 46. Section 44 extends over approximately one half of the top opening in the tube 20 and includes a flange 48, cylindrical sidewall 50, and a top 52. The cover flange 48 is suitably secured to the tube flange 26 as will be explained hereinafter. Thus, the securement may be obtained by a fastener or threaded element 54 passing through aligned openings in the cover flange 48 and in the tube flange 26. The cover section 44 is adapted to be pivoted about the fastening element 54 so as to provide access to the tube 20 to place articles to be dispensed within the tube 20. In order to secure the cover section 44 in its normal operating position, a clip 56 is provided. The clip 56 has one leg 58 secured to the tube flange 26 such as by a fastening element 60 and a nut 62 as shown in FIG. 1. With this arrangement the other leg 64 of the clip 56 is raised relative to the upper surface of the tube flange 26 so that the flange 48 on the cover section 50 can be received underneath the leg 64 of the clip 56, thereby securing and preventing the cover section 44 from being lifted off of the dispensing tube 20.

The second cover section 46 is pivotally or rotatably mounted on the first cover section 44 by means of a threaded bolt 66. Thus, it will be apparent that the cover section 46 may be rotated about the bolt 66 relative to the cover section 44 between an open posotion as shown in FIG. 2 and a closed position as shown in FIG. 3. When in the open position, the dispenser is operable to dispense the articles while in the closed position of FIG. 3 the closed cover protects the articles and serves to keep the heat in, in cases where heat is used.

Secured to the cover sections 44 by fastening elements 70, 72 is a wedge shaped member 68 made of a suitable material such as plastic. As will be seen in the drawings, the lower, bottom face of the wedge member 68 is disposed at an acute angle when the cover 48 is in place over the opening of the dispenser tube 20. Accordingly, the wedge member 68 will cause the top plate being dispensed to be disposed also at an acute angle, thereby facilitating withdraw of the top plate from the dispensing unit.

With the above construction, it will be seen that the top article, for example a plate, will bear against the wedge member as the spring 28 biases the stacked column of plates in an upper direction. The plates may be withdrawn from the dispenser merely by grasping the top plate and pulling it laterally (generally to the left as shown in FIG. 2). with the above arrangement, it will be seen that a stronger spring 28 may be used than otherwise would be possible if there were no cover or stop means over the opening of the dispensing tube 20. The strength of the spring 28 may be designed so that it will be capable of dispensing a wide range of weights of articles. Thus, for heavier articles, the spring 28 will have sufficient strength to effect its dispensing function. On the other hand, if lighter weight articles are to be dispensed, the stop means will continue to maintain the top article at the desired level even though the force applied by the spring 28 for holding the stacked column of articles will be stronger.

FIG. 4 shows an alternative embodiment in which a strap-like-element 64 is disposed over the opening of the dispenser tube 20. The strap-like-element 74 has flanges 76, 78 at its longitudinal ends suitably secured to the flange 26 of the dispenser tube 20 such as by fastening elements. For example, the fastening elements as used in the FIG. 1 embodiment may be utilized whereby the strap-like-element 74 may be swung or pivoted out of position to provide access for filling the dispenser tube 20 with articles. Since the strap-like element 64 has two raised leg portions 80, 82 joined to a cross piece 84, it will be seen that a plate will be urged between the two leg portions 80, 82 up against the cross piece 84 whereby the plate will be in a position to be withdrawn latterly from either side of the dispensing unit. As soon as one plate is withdrawn, the next plate will be urged up against the cross piece by the spring 28.

FIG. 5 to 7 show a further alternate embodiment. In this alternate embodiment, similar numerals have been used for similar parts. In FIG. 5, the stop means is formed by a rod-like element 84. The rod-like element has two, outer verticle legs 86, 88 suitably secured to the flange 26 of the dispenser tube 20. These legs may be fitted into openings in the flange 26. The rod-like element 84 includes a central portion having two sections formed as a V. The V-shaped section 90 slopes downwardly towards the periphery of the dispenser tube 20 as best shown in FIG. 6. Accordingly, it will be seen that the top plate 89 (FIG. 7) in the stacked column 90 will be disposed and an acute angle relative to horizontal, such acute angle corresponding to the angle of the V-shaped section 90 of the rod-like element 84. With this arrangement, the top plate 89 will be pointed or directed upwardly at a slight incling thereby facilitating its withdrawal in a lateral direction.

FIGS. 8 to 10 show a further alternative embodiment comprising a cover 92 extending over the opening of the dispensing tube 20. The cover 92 includes a flange 94 secured to the flange 26 on the dispensing tube 20, a cylindrical portion 96 and a top 98. Secured to the top 98 by fastening elements 100, 102 is a wedge-shaped member 104 made of a suitable material such as plastic. The angle or the bottom face of the wedge member 104 is disposed at an acute angle then the cover 92 is in place over the opening of the dispenser tube 20. Accordingly, the wedge 104 will cause the top plate 106 to be disposed also at an acute angle, thereby facilitating withdrawal of the top plate 106 from the dispensing tube 20 as in the case of the prior embodiments.

FIGS. 11 and 12 show another alternate embodiment wherein there is provide a cover 108 having a flange 110 adapted to be secured to the flange 26 of the dispensing tube 20. The cover 108 includes an upright, cylindrical portion 112 and a top 114 which is inclined relative to horizontal. Accordingly, it will be seen in FIG. 11 that the cover 108 is constructed and arranged to dispose the top plate 116 at an acute angle to facilitate its withdrawal as in the case of the prior embodiments.

FIGS. 13 and 14 show another alternate embodiment somewhat similar to the embodiments in FIGS. 5 to 7. In the embodiment of FIGS. 13 and 14, the stop means is formed by a rod-like element 118 having two, outer vertical legs 120, 122 suitably secured to the flange 26 of the dispenser tube 20. The rod-like element 118 includes a central portion having two sections 124, 126 formed as a V. The V-shaped section slopes downwardly towards the periphery of the dispenser tube as best shown in FIG. 14. The apex 128 of the V is secured to the dispenser tube flange by an upright rod 130. Accordingly, it will be seen that the top plate in the stacked column will be disposed at an acute angle relative to horizontal, such acute angle corresponding to the angle that the V-shaped section of the rod-like element 118 makes with the horizontal. With this arrangement, the top plate will be directed upwardly at a slight incline, thereby facilitating its withdrawal in a lateral direction.

FIGS. 15 and 16 show a further alternate embodiment. In this embodiment, the stop means is formed by a rod-like element 132 having a vertical leg portion 134 secured to the flange 26 of the dispenser tube 20 and an inclined portion 136 extending upwardly at an incline and towards the center of the dispenser tube 20. The upright portion 134 is suitably secured to the dispenser tube flange 26. Here again, it will be seen that the top plate in the stacked column will be disposed at an acute angle relative to horizontal, such acute angle corresponding to the angle of the top portion 136 of the rod-like element relative to the general plane of the dispenser tube flange 20.

FIG. 17 shows a further alternate embodiment similar to the embodiment of FIGS. 15 and 16 except that two rod-like elements 138, 140 are used instead of one. In this case the two rod-like elements 138, 140 are disposed on either sides of a diametrical line as shown in FIG. 17. Both rod-like elements 138, 140 have an upright portion and an inclined lateral portion corresponding generally to the configuration of the rod-like element shown in FIGS. 15 and 16.

FIGS. 18 to 20 show yet another alternate embodiment in which the stop means comprises two strap members 142, 144 suitably secured to one another. The strap member 144 has two upright portions, a cross-piece 147 and two flange portions 146, 148. The two flange portions 146, 148 are secured to the dispenser tube flange 26. The strap member 142 has a general triangular configuration and includes an upright portion and a flange portion 150 secured to the flange 26 of the dispenser tube. The cross-piece 147 of the strap member 144 is secured to the triangular portion of the strap member 142. A suitable upright flange 152 may be provided on the strap member 142. When the flanges 146, 148, 150 are secured to the flange 26 of the dispenser tube 20, the triangular portion of the strap member 142 will be disposed at an acute angle relative to horizontal, thereby facilitating withdraw of the top plate as in the prior embodiments.

The stop means in the various embodiments may be provided with a roller or the like to engage the top plate to be dispensed to facilitate its withdrawal.

From the above description, it will be seen that there has been disclosed various stop means operable to determine the position of the upper most article of an array of stacked articles to be dispensed. Although the illustrated embodiments relate to dispensing plates, it will be understood that the principles of the present invention may be applied to dispensing various other articles besides plates.

While the invention has been described by means of specific examples and in specific embodiments, it is not intended to be limited thereto, for obvious modifications will occur to those skilled in the art without departing from the spirit and scope of the invention.

What is claimed is:

1. A dispensing device comprising container means containing a column of rigid articles to be dispensed, said container means having an opening through which said rigid articles are dispensed, biasing means urging said column in one longitudinal direction towards said opening, stop means mounted in a fixed position relative to said opening and disposed in a position to engage one longitudinal end of said column, said stop means including a section extending over said opening of said container means and having a length greater than at least one-half the radius of said opening in said container means, said section of said stop means including a straight line portion disposed at an acute angle relative to the longitudinal axis of said column, said stop means including a cover having a first and a second cover element, means pivotally mounting said first cover element on said second cover element such that said first cover element is rotatable between a closed position and an open position, said biasing means urging said column in said one longitudinal direction so that the end article at said one longitudinal end of said column engages said section of said stop means, whereby when said end article is withdrawn upon being dispensed, said biasing means moves said column in said one longitudinal direction to cause the next succeeding article in the stacked column to engage said section of said stop means and to tilt said next succeeding article at an acute angle relative to the longitudinal axis of said column to thereby facilitate dispensing of said article.

2. A dispensing device according to claim 1 wherein said section of said stop means includes wedge means mounted on said second cover element, said wedge means having a surface engageable by said end article, said surface being disposed at an acute angle relative to the general plane of said dispensing opening in said container means.

3. A dispensing device according to claim 1 wherein said opening in said container means is surrounded by a flange, means pivotally mounting said second cover element on said flange, and clip means on said flange engageable with said second cover element to secure the latter in operable position on said flange.

* * * * *